UNITED STATES PATENT OFFICE.

FREDERICK W. LYONS AND EDWARD ZIEGLER, OF JERSEY CITY, N. J.

IMPROVEMENT IN INSECTICIDE COMPOUNDS.

Specification forming part of Letters Patent No. 222,413, dated December 9, 1879; application filed October 24, 1879.

*To all whom it may concern:*

Be it known that we, FREDERICK W. LYONS and EDWARD ZIEGLER, of Jersey City, in the county of Hudson and State of New Jersey, have invented a new and useful Compound or Insecticide for the destruction of rats, mice, roaches, and all vermin, which compound is fully described in the following specification.

Rats, mice, roaches, water-bugs, ants, and all vermin are especially fond of cheese; and by our invention this article, although it has undergone a chemical process that renders it deadly poison to every living thing that partakes of it, remains, in taste and appearance, the same as new cheese, and all vermin partake of it greedily.

The compound which we have produced may be made by the following formula: Break one pound of ordinary dairy-cheese into small pieces, and thoroughly dry by a gentle heat not to exceed ninety-four degrees (94°) Fahrenheit, twenty-four hours being usually required in the drying. When thoroughly dried reduce to a granular powder and add one-fourth pound corrosive sublimate, (bichloride of mercury,) one-fourth pound arsenic, and ten grains salicylic acid. Mix well.

The taste and appearance of the cheese are preserved by the salicylic acid and corrosive sublimate, the latter at the same time acting as a poison upon the vermin partaking of the cheese, and the arsenic is added in order that the quantity of cheese partaken may contain enough poison to make death certain.

We are aware that the cheese and the poisonous ingredients used by us are not, separately, new for this purpose; but What we consider as new, and desire to secure by Letters Patent, is—

The insecticide compound herein described, consisting of arsenic, corrosive sublimate, salicylic acid, and cheese, in about the proportions set forth.

Witness our hands in the matter of our application for a patent for a new and useful compound or insecticide for the destruction of rats, mice, roaches, and all vermin, this 13th day of October, A. D. 1879.

FREDERICK W. LYONS.
                EDWARD ZIEGLER.

Witnesses:
    JAMES ROBOTTOM,
    CHAS. L. D. WASHBURN.